US011696326B2

(12) United States Patent
Elshafie et al.

(10) Patent No.: US 11,696,326 B2
(45) Date of Patent: Jul. 4, 2023

(54) STRATEGIC CHANNEL SENSING

(71) Applicant: QUALCOMM Incorporated, San Diego, CA (US)

(72) Inventors: Ahmed Elshafie, San Diego, CA (US); Ahmed Attia Abotabl, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 17/163,050

(22) Filed: Jan. 29, 2021

(65) Prior Publication Data
US 2022/0248460 A1    Aug. 4, 2022

(51) Int. Cl.
*H04W 74/08* (2009.01)
*H04W 72/04* (2023.01)

(52) U.S. Cl.
CPC ....... *H04W 74/0808* (2013.01); *H04W 72/04* (2013.01)

(58) Field of Classification Search
CPC ............. H04W 74/0808; H04W 72/04; H04W 72/541; H04W 72/542; H04W 72/02
See application file for complete search history.

(56) References Cited

U.S. PATENT DOCUMENTS

| | | | |
|---|---|---|---|
| 2019/0132832 A1* | 5/2019 | Uchiyama | H04W 72/04 |
| 2020/0029340 A1 | 1/2020 | He et al. | |
| 2020/0229171 A1 | 7/2020 | Khoryaev et al. | |
| 2020/0267523 A1* | 8/2020 | Tang | H04W 72/53 |
| 2020/0280398 A1* | 9/2020 | Hwang | H04W 72/0446 |
| 2020/0314803 A1* | 10/2020 | Zhang | H04W 74/006 |
| 2021/0007081 A1* | 1/2021 | Shin | H04W 72/02 |
| 2021/0144582 A1* | 5/2021 | Yi | H04W 28/0278 |
| 2021/0219268 A1* | 7/2021 | Li | H04L 1/08 |
| 2022/0086805 A1* | 3/2022 | Zhang | H04W 72/02 |
| 2022/0225290 A1* | 7/2022 | Ganesan | H04L 5/0057 |
| 2022/0232549 A1* | 7/2022 | Yeo | H04L 1/0027 |
| 2022/0272709 A1 | 8/2022 | Jiang | |
| 2022/0330261 A1* | 10/2022 | Yeo | H04W 72/087 |

FOREIGN PATENT DOCUMENTS

| | | | |
|---|---|---|---|
| CN | 3373679 | * 12/2018 | H04W 72/04 |
| EP | 3373679 A1 | 9/2018 | |

OTHER PUBLICATIONS

International Search Report and Written Opinion—PCT/US2022/011611—ISA/EPO—dated Apr. 20, 2022 (2101269WO).

* cited by examiner

*Primary Examiner* — Jae Y Lee
(74) *Attorney, Agent, or Firm* — Holland & Hart LLP

(57) ABSTRACT

Methods, systems, and devices for wireless communications are described. A user equipment (UE) may perform, during at least a portion of a sensing window, a sensing process to identify a quantity of resources of a sidelink channel that are available for transmission by the UE during a selection window. The UE may terminate the sensing process before expiry of the sensing window based on the quantity of resources satisfying an early termination threshold. The UE may then transmit, during the selection window, a set of data over the sidelink channel using the quantity of resources.

26 Claims, 13 Drawing Sheets

STRATEGIC CHANNEL SENSING

FIELD OF TECHNOLOGY

The following relates to wireless communications, including strategic channel sensing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, UEs may engage in sidelink communications that are not routed through a base station or other intermediary device. Sidelink communications may present various challenges.

SUMMARY

The described techniques relate to improved methods, systems, devices, and apparatuses that support strategic channel sensing. A user equipment (UE) may be configured with a sensing window during which the UE is to perform a sensing process to determine sidelink resources that are available for transmission. The UE may perform the sensing process until the UE determines a threshold quantity of available sidelink resources, at which time the UE may terminate the sensing process.

DETAILED DESCRIPTION

Some wireless communication networks may support sidelink communications between user equipments (UEs) in which information is exchanged between two or more UEs without being routed through a base station or other intermediary device. To obtain sidelink channel resources for a sidelink transmission, a UE may perform a sensing process during a sensing window configured for the UE. As part of the sensing process the UE may measure subchannels of the sidelink channel to determine available resources for the UE to select from for use. The UE may be configured to perform the sensing process for the entirety of the sensing window, which may consume excess power and processing resources, among other disadvantages.

According to the techniques described herein, a UE may conserve power and processing resources, among other advantages, by terminating a sensing process partway through the sensing window configured for the UE. The UE may determine an appropriate time to terminate the sensing process based on the quantity of available resources identified by the sensing process. For example, the UE may terminate the sensing process based on determining that a threshold quantity of available resources has been identified. The threshold quantity may be greater than or equal to the quantity of resources identified for transmission of a data set. Thus, the UE may engage in strategic sensing for a sidelink channel by terminating a sensing process upon identifying a desired quantity of available resources.

Aspects of the disclosure are initially described in the context of a wireless communications system. Aspects of the disclosure are further described in the context of an additional wireless communications system and process flows. Aspects of the disclosure are further illustrated by and described with reference to apparatus diagrams, system diagrams, and flowcharts that relate to various aspects of radio link management.

Aspects of the disclosure are initially described in the context of wireless communications systems. Aspects of the disclosure are further described in the context of an additional wireless communication system, sensing and selecting windows, and a process flow. Aspects of the disclosure are further illustrated by and described with reference to apparatus diagrams, system diagrams, and flowcharts that relate to strategic channel sensing.

Figure 1:
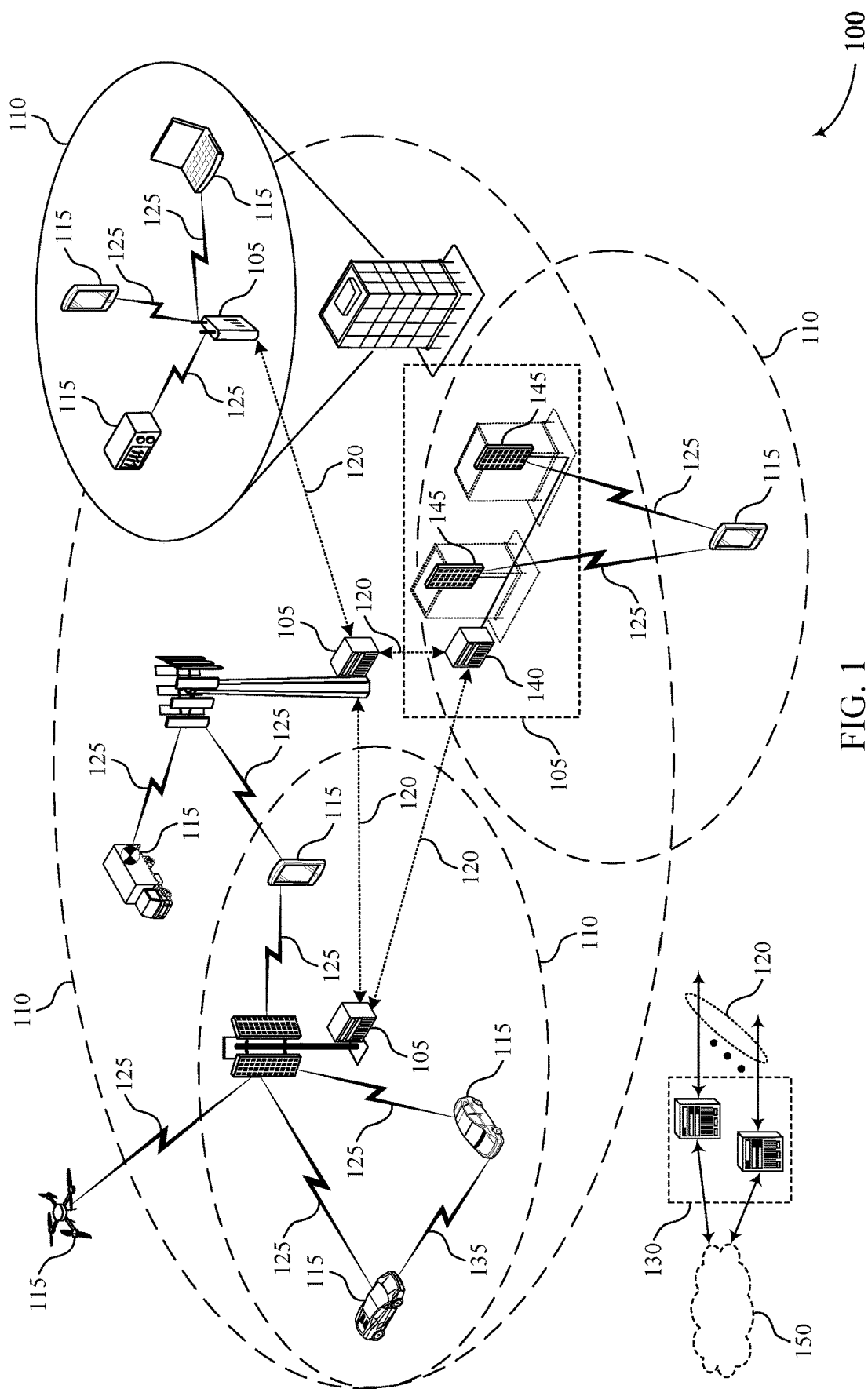
FIG. 1 illustrates an example of a wireless communications system that supports strategic channel sensing in accordance with aspects of the present disclosure.

FIG. 1 illustrates an example of a wireless communications system 100 that supports strategic channel sensing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the UEs 115 may engage in sidelink (or "direct") communications, which may be communications that are not routed through a base station 105 or other intermediary device. To identify sidelink resources that are available for transmission a UE 115 may perform a sensing process for the entirety of a sensing window configured for the UE 115. Because the sensing process may consume power and process resources, indiscriminately performing the sensing process for the entirety of the sensing window may be inefficient, among other disadvantages. According to the techniques described herein, a UE 115 may improve the efficiency of a sensing process by terminating the sensing process before expiry of the sensing window. For example, the UE 115 may terminate the sensing process upon determining that the sensing process has identified a threshold quantity of resources that are available for transmission.

Figure 2:
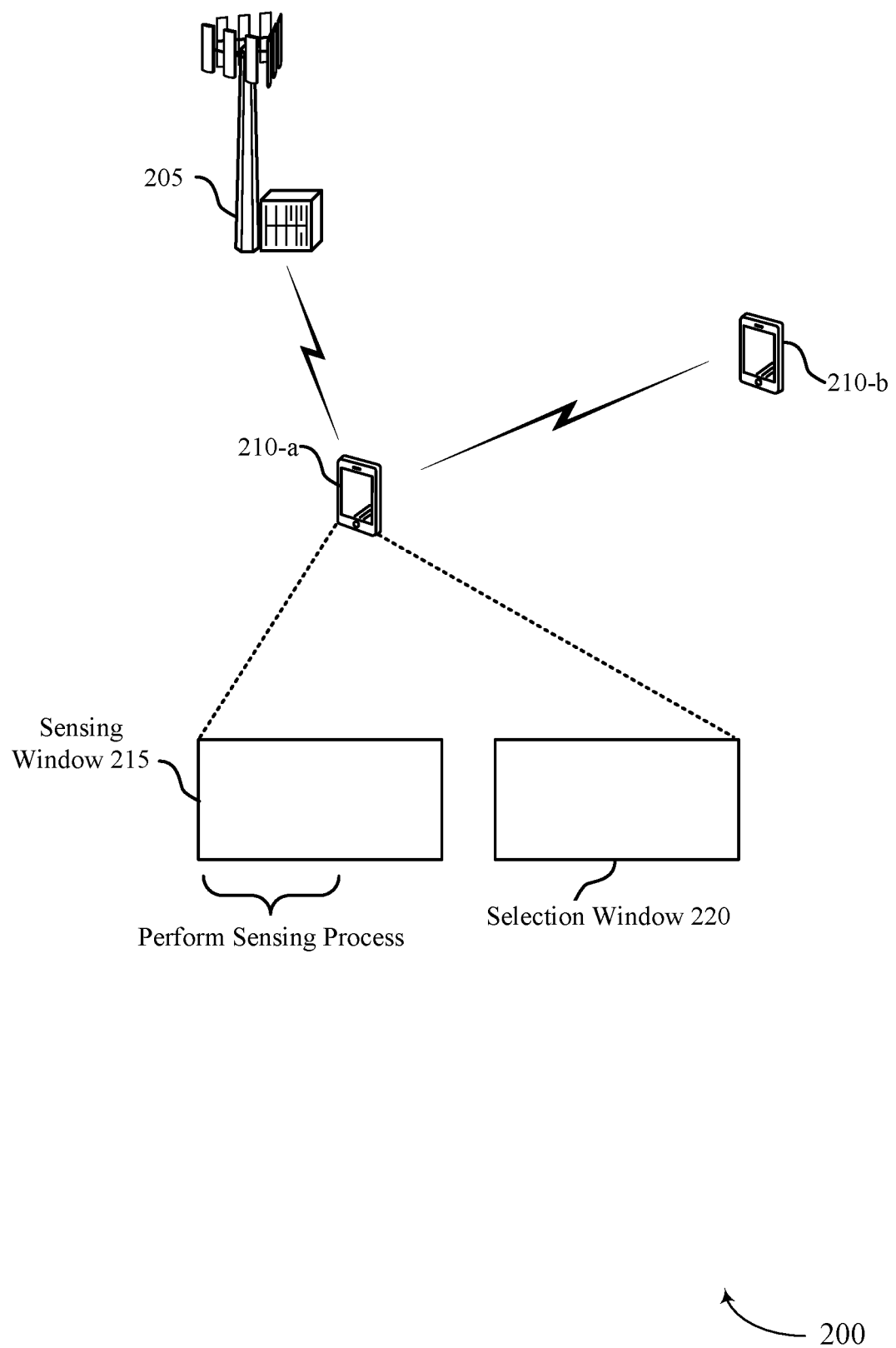
FIG. 2 illustrates an example of a wireless communications system that supports strategic channel sensing in accordance with aspects of the present disclosure.

FIG. 2 illustrates an example of a wireless communications system 200 that supports strategic channel sensing in accordance with aspects of the present disclosure. In some examples, the wireless communications system 200 may implement aspects of the wireless communications system 100. For example, the wireless communications system 200 may include base station 205, UE 210-a, and UE 210-b, which may be examples of a base station 105 and UEs 115 as described with reference to FIG. 1. To conserve power and processing resources, among other reasons, UE 210-a may terminate a sensing process partway through a sensing window configured for UE 210-a expires (as opposed to terminating the sensing process upon expiry of the sensing window).

UE 210-a may communicate with base station 205 and UE 210-b, among other devices (not shown). The communications between UE 210-a and UE 210-b may be routed through an intermediary device (e.g., the base station 205) or may be exchanged directly between UE 210-a and UE 210-b, a technique which may be referred to as sidelink communication. Communications between UE 210-a and the base station 205 may occur through a first interface (e.g., the Uu interface) whereas sidelink communications between UE 210-a and UE 210-b may occur through a second interface (e.g., the PC5 interface). In some examples, communications between a UE 210 and the base station 205 may be referred to as Uu communications.

UE 210-a may support multiple resource allocation modes for sidelink communications. For example, UE 210-a may implement sidelink communications with another device in Mode 1 or in Mode 2, which may be V2X mode, among other modes. In Mode 1, the base station 205 (or other controlling device) may not only configure sidelink resources for UE 210-a but also schedule communications between UE 210-a and another UE 210 over the configured sidelink resources. For example, the base station 205 may send UE 210-a downlink control information (DCI) that includes a dynamic grant indicating the resources (e.g., time and frequency) for one or more sidelink transmissions by UE 210-a. Additionally or alternatively, the base station may use RRC signaling to schedule the sidelink resources UE 210-a.

In Mode 2, the base station 205 (or UE 210-b) may configure UE 210-a with sidelink resources, but the scheduling of those resources may be performed by UE 210-a (as opposed to the base station 205 or other controlling device). For example, UE 210-a may use sidelink control information (SCI) (e.g., SCI1, SCI2) to schedule a subset of the configured sidelink resources for a transmission by UE 210-a. SCI1 may also be referred to as first stage SCI and SCI2 may also be referred to as second stage SCI. SCI1 may be transmitted in a physical sidelink control channel (PSCCH) and SCI2 may be transmitted in a physical sidelink shared channel (PSSCH), which may also be used to convey the scheduled data. In some examples, SCI1 may convey information about the allocation of the PSSCH and SCI2 may convey information for locating and decoding the data in the PSSCH.

To determine resources that are available for transmission, UE 210-a may perform a sensing process during a sensing window 215 configured for UE 210-a. A sensing process may also be referred to as a sensing procedure, a sensing operation, or other suitable terminology. During the sensing process UE 210-a may sense the sidelink channel by measuring the reference signal received power (RSRP) (or other metric(s)) of subchannels included in the sidelink channel. UE 210-a may use the RSRP to determine resources in the selection window 220 that are available for transmission. UE 210-a may perform the sensing process for subchannels on a slot-by-slot basis for the entirety of the sensing window, 215 which may consume excess power and processing resources, among other disadvantages. According to the techniques described herein, UE 210-a may conserve power and processing resources, among other advantages, by terminating the sensing process before the end of the sensing window 215. That is, UE 210-a may perform the sensing process for a portion of the sensing window 215, rather than for the entire duration of the sensing window 215.

UE 210-a may determine an appropriate time to terminate the sensing process based on detecting a threshold quantity of resources that are available for transmission. For example, given a threshold quantity $Q_{THLD}$, UE 210-a may perform the sensing process until UE 210-a has identified $Q_{THLD}$ available resources, where available resources are those that are available for transmission by UE 210-a. In some examples, the threshold quantity $Q_{THLD}$ may be equal to $R_{TBS}$, which may be a quantity of resources (e.g., e.g., a minimum quantity of resource elements) for (e.g., to obtain) a transport block size (TBS) for a set of data that UE 210-a has buffered for transmission during the selection window 220. In other examples, the threshold quantity $Q_{THLD}$ may greater than $R_{TBS}$, which may allow UE 210-a to increase the reliability and/or coding gain of the transmission (e.g., by using more than $R_{TBS}$ resources for the transmission). For example, the threshold quantity $Q_{THLD}$ may be equal to the product of $R_{TBS}$ and a reliability factor X.

To determine $R_{TBS}$, which may be a basis for the threshold quantity $Q_{THLD}$, UE 210-a may use equation (1), where $N_{Info}$ is the quantity of information bits associated with the data set, $N_{Layers}$ is the quantity of layers for transmission of the data set, CodeRate is the code rate for the data set, and $M_{Order}$ is the modulation order for the data set.

$$R_{TBS} = \frac{R_{info}}{N_{Layers} \cdot CodeRate \cdot M_{Order}} \quad (1)$$

UE 210-a may determine $N_{Info}$ based on the set of data, may determine $N_{Layers}$ based on the channel state information (CSI) for the sidelink channel, and may determine CodeRate and $M_{Order}$ based on the modulation and coding scheme (MCS) for the set of data. In some examples, UE 210-a may determine the MCS for the set of data based on the target error rate for the set of data (e.g., the target block error rate (BLER)) and the CSI for the sidelink channel. So, the threshold quantity $Q_{THLD}$ may be determined based on any of the above listed factors or criteria, among others.

As noted, the threshold quantity $Q_{THLD}$ may be equal to $R_{MIN}$ or equal to the product of $R_{TBS}$ and the reliability factor X. In some examples, the reliability factor X may be preconfigured at UE 210-a. Alternatively, UE 210-a may determine the reliability factor X autonomously. For example, UE 210-a may determine the reliability factor X based on a quality-of-service (QoS) metric for the set of data, based on a priority level for the set of data or transmission, based on a power level or other power metric of UE 210-a, or based on two or more of these factors, among other factors. Higher QoS, higher priority levels, and higher power levels may be associated with higher values of the reliability factor X, whereas lower QoS, lower priority levels, and lower power levels may be associated with lower values of the reliability factor X. In some examples, UE 210-a may be configured with a table that provides a respective reliability factor X for different combinations of parameters (e.g., QoS, priority level).

In some examples, UE 210-a may receive the reliability factor X from a controlling device (e.g., the base station 205 or UE 210-b). The controlling device may select the reliability factor X based on operating information from UE 210-a, such as the reliability target for the data set or UE 210-a, power information for UE 210-a, and priority information for UE 210-a. In some examples, the operating information may include a recommended value for the reliability factor X.

Thus, UE 210-a may conserve power and processing resources, among other advantages, by terminating the sensing process before the sensing window 215 expires.

Figure 3:
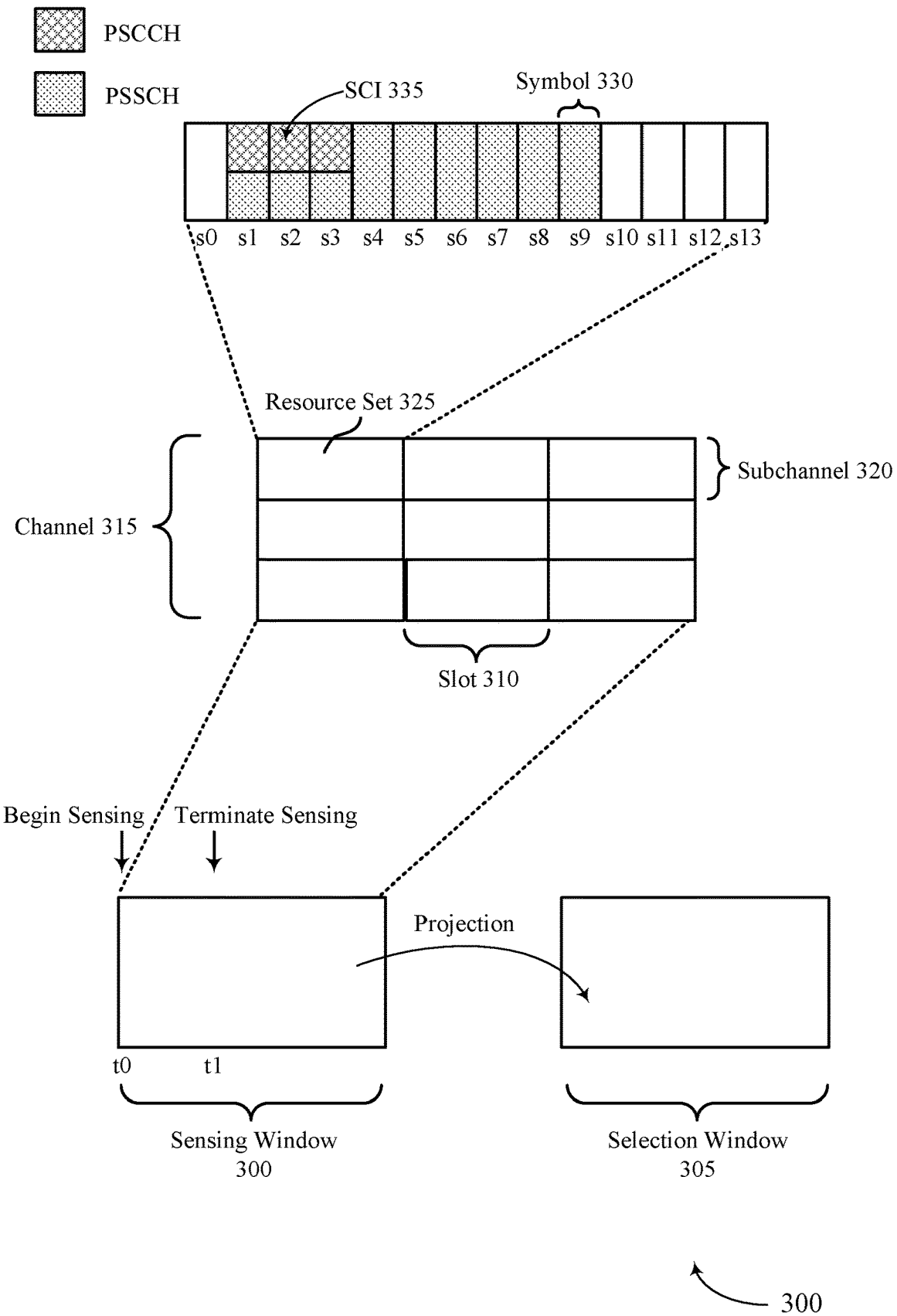
FIG. 3 illustrates an example of windows that support strategic channel sensing in accordance with aspects of the present disclosure.

FIG. 3 illustrates an example of a sensing window 300 and a selection window 305 that support strategic channel sensing in accordance with aspects of the present disclosure. The sensing window 300 and selection window 305 may be configured for a UE. To save power and processing resources, the UE may perform a sensing process for a portion of the sensing window 300 by terminating the sensing process early (e.g., before the end of the sensing window). The sensing window 300 may include one or more contiguous slots 310, which may also be referred to as time slots, and may encompass a channel 315 (e.g., a sidelink channel) that includes one or more contiguous subchannels 320. In some examples of sidelink communications, the minimum resource allocation unit in the frequency domain is a subchannel 320 and the minimum resource allocation unit in the time domain is a slot 310. In some examples, the sensing window 300 and the selection window 305 may be included in one or more resource pools in which sidelink communications take place. In some examples, the selection window 305 is determined based on a trigger, such as the detected presence of data buffered for sidelink communication. For example, given a trigger in subframe i, the resources for the selection window 305 may be selected in a window [i+T$_1$, i+T$_2$], where T$_1$ is determined by the UE and T$_2$ is configured per priority.

The UE may start the sensing process at time t0, at the start of the sensing window 300. As part of the sensing process, the UE may measure the RSPR (or another power metric) for reference signals (e.g., demodulation reference signals (DMRS)) associated with resources in the subchannels 320 of the channel 315. The DMRS may be conveyed in the physical sidelink control channel (PSCCH), the physical sidelink shared channel (PSSCH), or both. The UE may determine whether resources in the selection window 305 are available for transmission based on the measured RSRP for associated resources in the sensing window. For example, the UE may project the RSPR for resources of the sensing window 300 onto associated resources of the selection window 305. If the RSRP projected onto resources of the selection window satisfies a threshold, the UE may determine that the resources are available for transmission (e.g., unoccupied, or occupied by a lower priority UE). Available resources in the selection window 305 may form a candidate resource set from which the UE may select (e.g., randomly) resources for transmission. The UE may select resources from the candidate resource set such that all re-transmissions for a packet occur within its latency budget. In some examples, the candidate resource set is reported to higher layers.

If the ratio of available resources to total resources (for the selection window 305) is less than a threshold ratio, the UE may increase the RSRP threshold and repeat the sensing process using the increased RSRP threshold.

To determine which resources should be sensed, the UE may decode the SCI 335 for some or all of the subchannels 320 in the channel 315. The SCI may indicate the resource allocation of the PSSCH associated with that subchannel, among other information. In some examples, the UE may sequentially decode the SCI for the subchannels 320 of a slot 310 (or, put another way, the UE may sequentially decode the SCI for the resource sets 325).

Rather than performing the sensing process for the entirety of the sensing window 300, the UE may save power and processing resources by terminating the sensing process before the end of the sensing window 300 (so that the sensing process is performed for a portion of the sensing window 300). For example, the UE may terminate the sensing process at time t1 based on determining a quantity of available resources equal to the threshold quantity Q$_{THLD}$. The UE may then use the quantity of available resources to transmit a set of data during the selection window 305.

As noted, the sensing window 300 may include slots 310 and may span subchannels 320. The resources covered by one slot 310 and one subchannel 320 may be referred to as a resource set 325. So, the sensing window may encompass multiple resources sets 325. Each resource set 325 may include multiple symbols 330 (e.g., fourteen symbols, denoted s0 through s13) in the time domain and may span n physical resource blocks (PRBs) in the frequency domain, where a PRB is made up of y resource elements (REs). Each resource set 325 may include a respective PSCCH that carries SCI 335, among other information, and a PSSCH that carries data, among other information. The SCI 335 may contain information to enable sensing operations as well as information about the resource allocation of the PSSCH. So, the UE may reference (e.g., decode) the SCI for a resource set 325 (or, put another way, for a subchannel 320 of a slot 310) to determine which resources to measure for RSRP. If resources in the PSSCH are reserved for transmission by other UEs, the SCI 335 may indicate the priority associated with those reservations.

In some examples, the leading symbol (s0) may carry redundant information for the second symbol (s1) (e.g., for automatic gain control (ACG)). When the resource set 325 is configured for feedback, the s11 and s12 symbols may include the physical sidelink feedback channel (PSFCH) for carrying feedback information and the s10 and s13 symbols may be gap symbols. When the resource set 325 is not configured for feedback, the s10, s11, and s12 symbols may be part of the PSSCH and the s13 symbol may be a gap symbol.

Although shown with a particular configuration of the sensing window 300, the techniques described herein can be implemented using other configurations of the sensing window 300. Similarly, although shown with a particular configuration of the resource set 325, the techniques described herein can be implemented using other configurations of the resource set 325.

Figure 4:
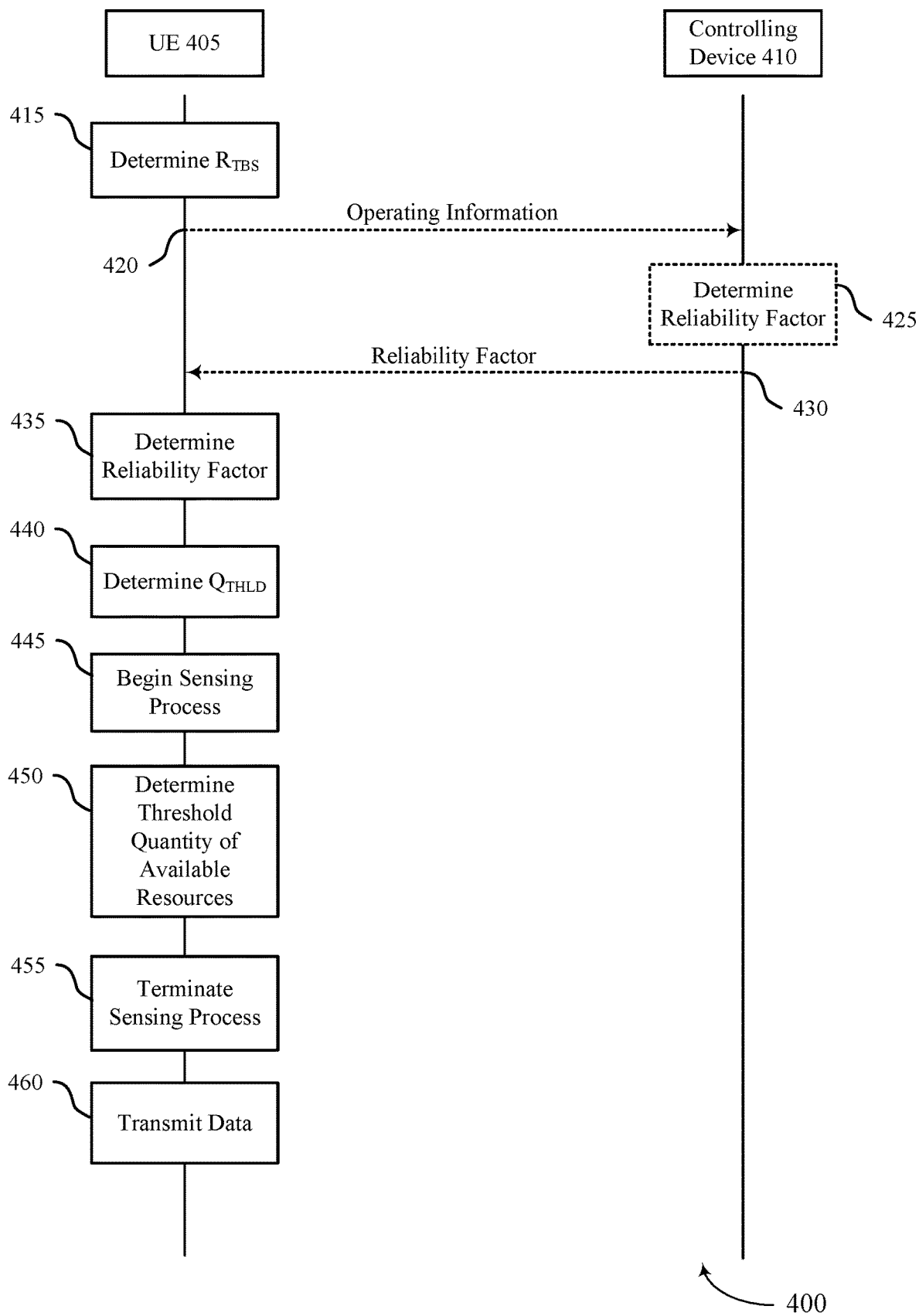
FIG. 4 illustrates an example of a process flow that supports strategic channel sensing in accordance with aspects of the present disclosure.

FIG. 4 illustrates an example of a process flow 400 that supports strategic channel sensing in accordance with aspects of the present disclosure. In some examples, process flow 400 may implement aspects of wireless communications system 100 or 200. For example, process flow 400 may be implemented by a UE 405 and controlling device 410. The controlling device 410 may be a UE or a base station that controls one or more aspects of the UE 405. For example, the controlling device 410 may control sidelink resource allocation or sidelink scheduling for the UE 405. By implementing process flow 400, the UE 405 may terminate a sensing process partway through a sensing window configured for the UE 405, thereby saving power and process resources, among other advantages.

At 415, the UE 405 may determine a quantity of resources (e.g., R$_{TBS}$) for transmission of a set of data buffered for a sidelink transmission. In some examples, UE 405 may determine the quantity of resources based on equation (1) or based on one or more of the factors in equation (1). At 420, UE the 405 may transmit operating information to the controlling device 410. The operating information may include one or more of power information for the UE 405, priority information for the UE 405, a reliability target for the UE 405, or a recommended value for the reliability factor X, among other parameters. At 425, the controlling device 410 may determine the reliability factor X for the UE 405. The controlling device 410 may determine the reliability factor X based on the operating information received at 420. In some examples, the controlling device 410 may also determine reliability factors for one or more other UEs (e.g., based on operating information for those UEs).

At 430, the controlling device 410 may transmit the reliability factor to the UE 405. In some examples, the reliability factor may be conveyed using RRC signaling or in a medium access control (MAC) control element (CE). In some examples, the controlling device 410 may also transmit the reliability factors for other UEs to those UEs. At 435, the UE 405 may determine the reliability factor for the sensing process. In some examples, the UE 405 determines the reliability factor based on the reliability factor received from the controlling device 410 at 430. In other examples, the UE 405 may determine the reliability factor autonomously (e.g., independent of the controlling device 410). In some examples, UE 405 determines the reliability factor based on a QoS metric for the set of data, based on a priority level for the set of data, based on a power level or other power metric of the UE 405, or based on two or more of these factors, among other factors. Higher QoS, higher priority levels, and higher power levels may be associated with higher values of the reliability factor X, whereas lower QoS, lower priority levels, and lower power levels may be associated with lower values of the reliability factor X.

At 440, the UE 405 may determine a threshold quantity of resources for terminating the sensing process. For example, the UE 405 may determine $Q_{THLD}$, which may also be referred to as an early termination threshold. In some examples, the threshold quantity may be equal to quantity of resources determined at 415 (e.g., $Q_{THLD}$ may be equal to $R_{TBS}$). In other examples, the threshold quantity may be greater than the quantity of resources determined at 415 (e.g., $Q_{THLD}$ may be equal to the product of the reliability factor X and $R_{TBS}$).

At 445, the UE 405 may begin a sensing process for a sidelink channel. The sensing process may begin coincident or concurrently with the start of a sensing window configured for the UE 405. As part of the sensing process, the UE 405 may receive a PSCCH for a resource set (e.g., a resource set 325) and decode the SCI in the PSCCH to determine the allocation of PSSCH, among other information. The UE 405 may then measure a power metric or other type of metric for reference signals in resources of the PSSCH (e.g., the UE 405 may measure the RSRP for DRMS). If the RSRP (or other metric) for some resources satisfies (e.g., is below) a threshold, the UE 405 may determine that associated resources in a subsequent selection window are available (e.g., unoccupied by transmissions from other UEs, or occupied by transmissions from lower priority UEs). The UE 405 may perform the sensing process for the resource sets 325 on a slot-by-slot basis until the sensing process is terminated.

At 450, the UE 405 may determine that the quantity of available resources identified by the sensing process satisfies (e.g., is greater than or equal to) a threshold (e.g., $Q_{THLD}$). Accordingly, at 455, the UE 405 may terminate the sensing process. In some examples, the sensing process may be terminated (stopped) before expiry of the sensing window, which may save power and process resources at the UE 405. If the determination to terminate the sensing process occurs before the UE 405 finishes sensing the subchannels in a slot, the UE 405 may finish sensing the subchannels in the slot before terminating the sensing process. At 460, the UE 405 may transmit the set of data over the sidelink channel using some or all of the available resources in the selection window.

Thus, the UE 405 may terminate the sensing process partway through the sensing window configured for the UE 405, thereby saving power and process resources, among other advantages.

Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 5:
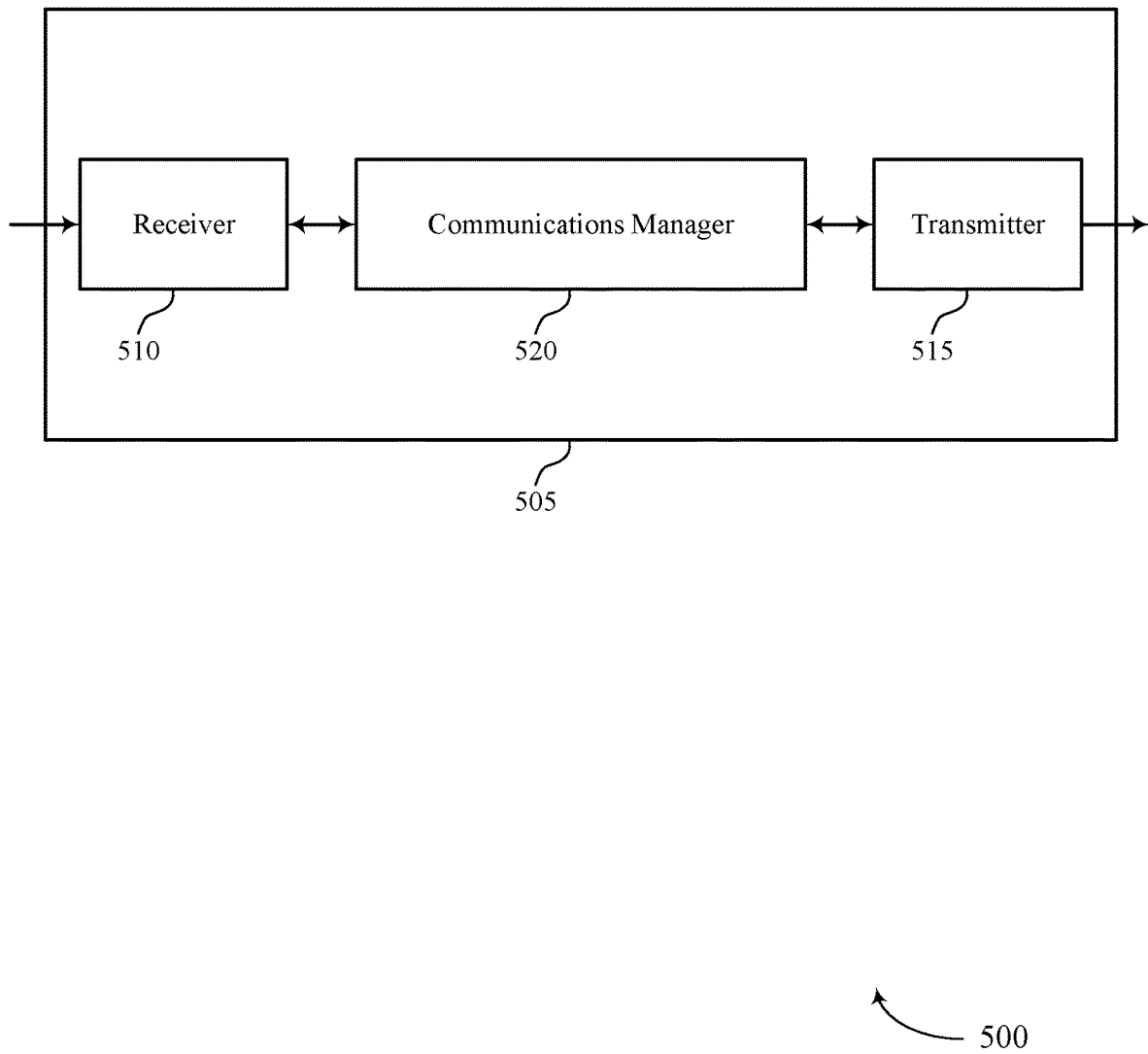
FIGS. 5 and 6 show block diagrams of devices that support strategic channel sensing in accordance with aspects of the present disclosure.

FIG. 5 shows a block diagram 500 of a device 505 that supports strategic channel sensing in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to strategic channel sensing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to strategic channel sensing). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of strategic channel sensing as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for performing, during at least a portion of a sensing window, a sensing process to identify a quantity of resources of a sidelink channel that are available for transmission by the UE during a selection window, the sensing window including a set of multiple contiguous time slots. The communications manager 520 may be configured as or otherwise support a means for terminating the sensing process before expiry of the sensing window based on the quantity of resources satisfying an early termination threshold. The communications manager 520 may be configured as or otherwise support a means for transmitting, during the selection window, a set of data over the sidelink channel using the quantity of resources.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing and reduced power consumption.

Figure 6:
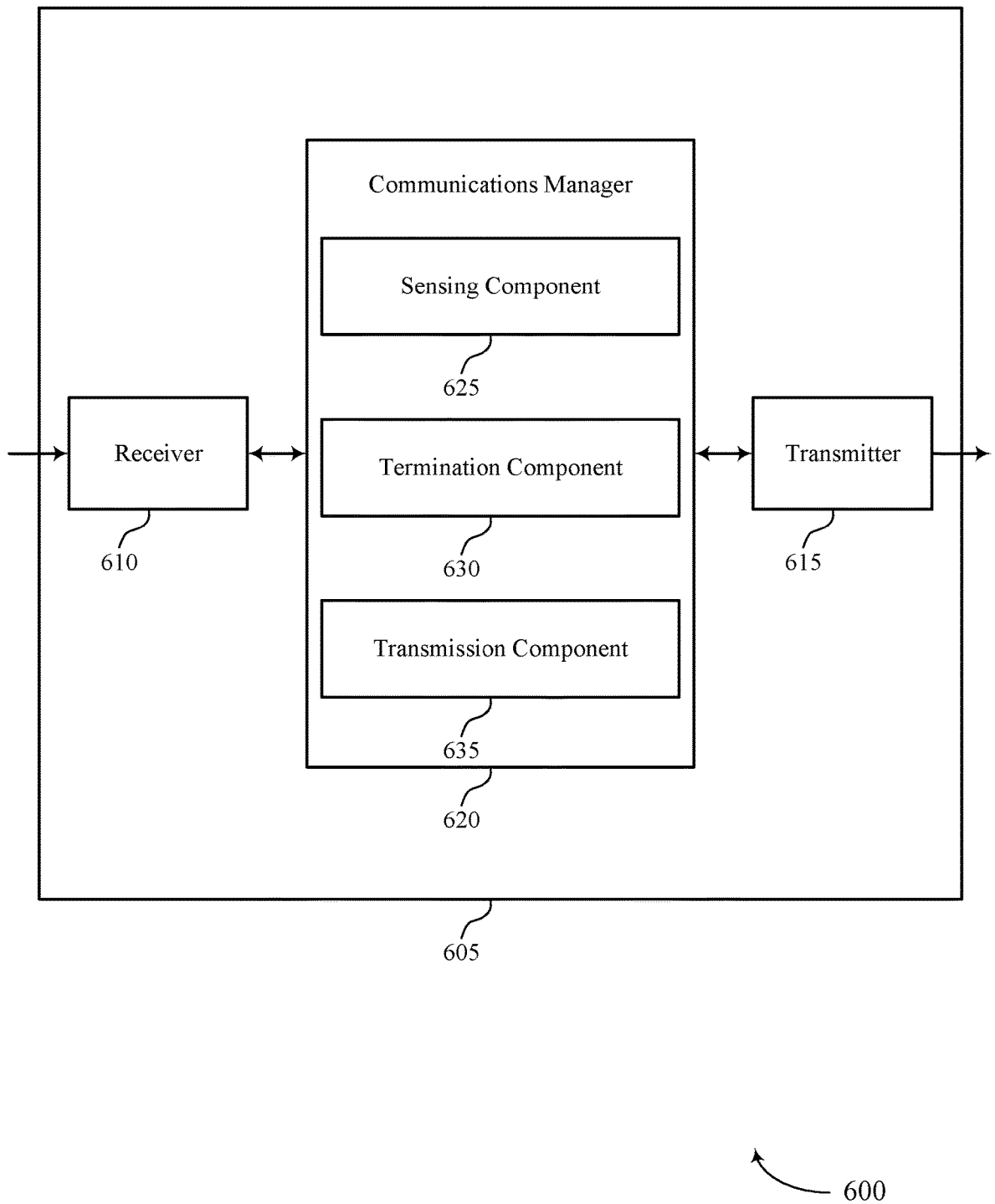

FIG. 6 shows a block diagram 600 of a device 605 that supports strategic channel sensing in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to strategic channel sensing). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to strategic channel sensing). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of strategic channel sensing as described herein. For example, the communications manager 620 may include a sensing component 625, a termination component 630, a transmission component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The sensing component 625 may be configured as or otherwise support a means for performing, during at least a portion of a sensing window, a sensing process to identify a quantity of resources of a sidelink channel that are available for transmission by the UE during a selection window, the sensing window including a set of multiple contiguous time slots. The termination component 630 may be configured as or otherwise support a means for terminating the sensing process before expiry of the sensing window based on the quantity of resources satisfying an early termination threshold. The transmission component 635 may be configured as or otherwise support a means for transmitting, during the selection window, a set of data over the sidelink channel using the quantity of resources.

Figure 7:
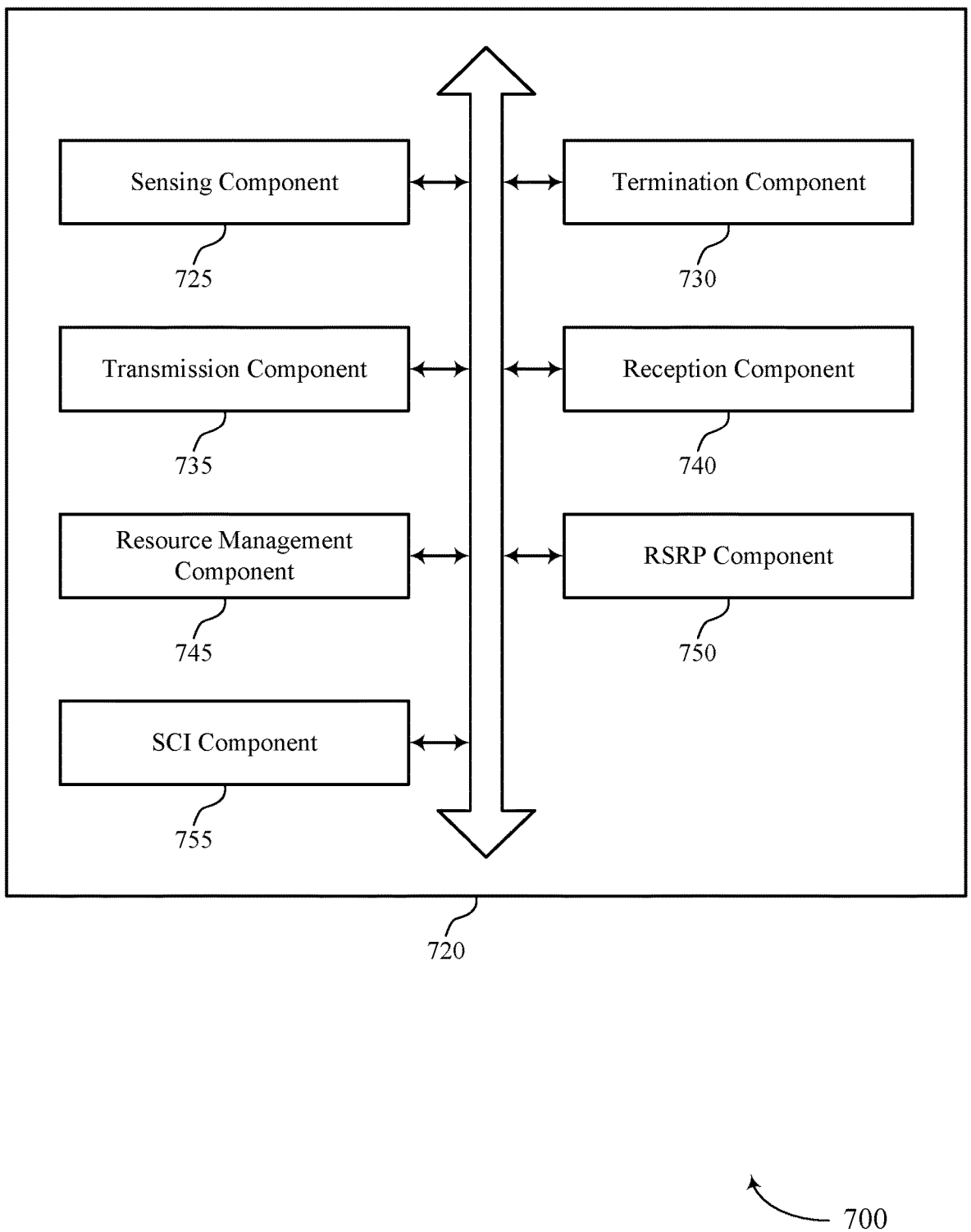
FIG. 7 shows a block diagram of a communications manager that supports strategic channel sensing in accordance with aspects of the present disclosure.

FIG. 7 shows a block diagram 700 of a communications manager 720 that supports strategic channel sensing in accordance with aspects of the present disclosure. The communications manager 720 may be an example of aspects of a communications manager 520, a communications manager 620, or both, as described herein. The communications manager 720, or various components thereof, may be an example of means for performing various aspects of strategic channel sensing as described herein. For example, the communications manager 720 may include a sensing component 725, a termination component 730, a transmission component 735, a reception component 740, a resource management component 745, an RSRP component 750, an SCI component 755, or any combination thereof. Each of these components may communicate, directly or indirectly, with one another (e.g., via one or more buses).

The communications manager 720 may support wireless communication at a UE in accordance with examples as disclosed herein. The sensing component 725 may be configured as or otherwise support a means for performing, during at least a portion of a sensing window, a sensing process to identify a quantity of resources of a sidelink channel that are available for transmission by the UE during a selection window, the sensing window including a set of multiple contiguous time slots. The termination component 730 may be configured as or otherwise support a means for terminating the sensing process before expiry of the sensing window based on the quantity of resources satisfying an early termination threshold. The transmission component 735 may be configured as or otherwise support a means for transmitting, during the selection window, a set of data over the sidelink channel using the quantity of resources.

In some examples, the reception component 740 may be configured as or otherwise support a means for receiving a reliability factor via radio resource control signaling or in a MAC-CE, where the early termination threshold is based on the reliability factor.

In some examples, the transmission component 735 may be configured as or otherwise support a means for transmitting operating information that includes one or more of power information for the UE, priority information for the UE, a reliability target for the UE, or a recommended reliability factor, where the reliability factor is received based on transmitting the operating information.

In some examples, the resource management component 745 may be configured as or otherwise support a means for determining the early termination threshold based on a second quantity of resources for the set of data, the second quantity of resources associated with a transport block size for the set of data.

In some examples, the resource management component 745 may be configured as or otherwise support a means for determining the early termination threshold based on a product of a reliability factor and a second quantity of resources for the set of data.

In some examples, the resource management component 745 may be configured as or otherwise support a means for determining the reliability factor based on a quality-of-service associated with a transport block for the set of data. In some examples, the resource management component 745 may be configured as or otherwise support a means for determining the reliability factor based on a priority level associated with the set of data.

In some examples, the resource management component 745 may be configured as or otherwise support a means for determining the early termination threshold based on a transport block size for the set of data and a modulation and coding scheme for the set of data.

In some examples, the resource management component 745 may be configured as or otherwise support a means for determining the early termination threshold based on a number of layers for the set of data.

In some examples, the resource management component 745 may be configured as or otherwise support a means for determining a target error rate for the set of data and channel state information for the sidelink channel, where the number of layers is based on target error rate and the channel state information.

In some examples, to support sensing process, the RSRP component 750 may be configured as or otherwise support a means for determining a reference signal received power for resources associated with the sensing window, where the quantity of available resources is based on the reference signal received power.

In some examples, the SCI component 755 may be configured as or otherwise support a means for decoding sidelink control information associated with the sidelink channel, where the sensing process is performed on resources indicated by the sidelink control information.

Figure 8:
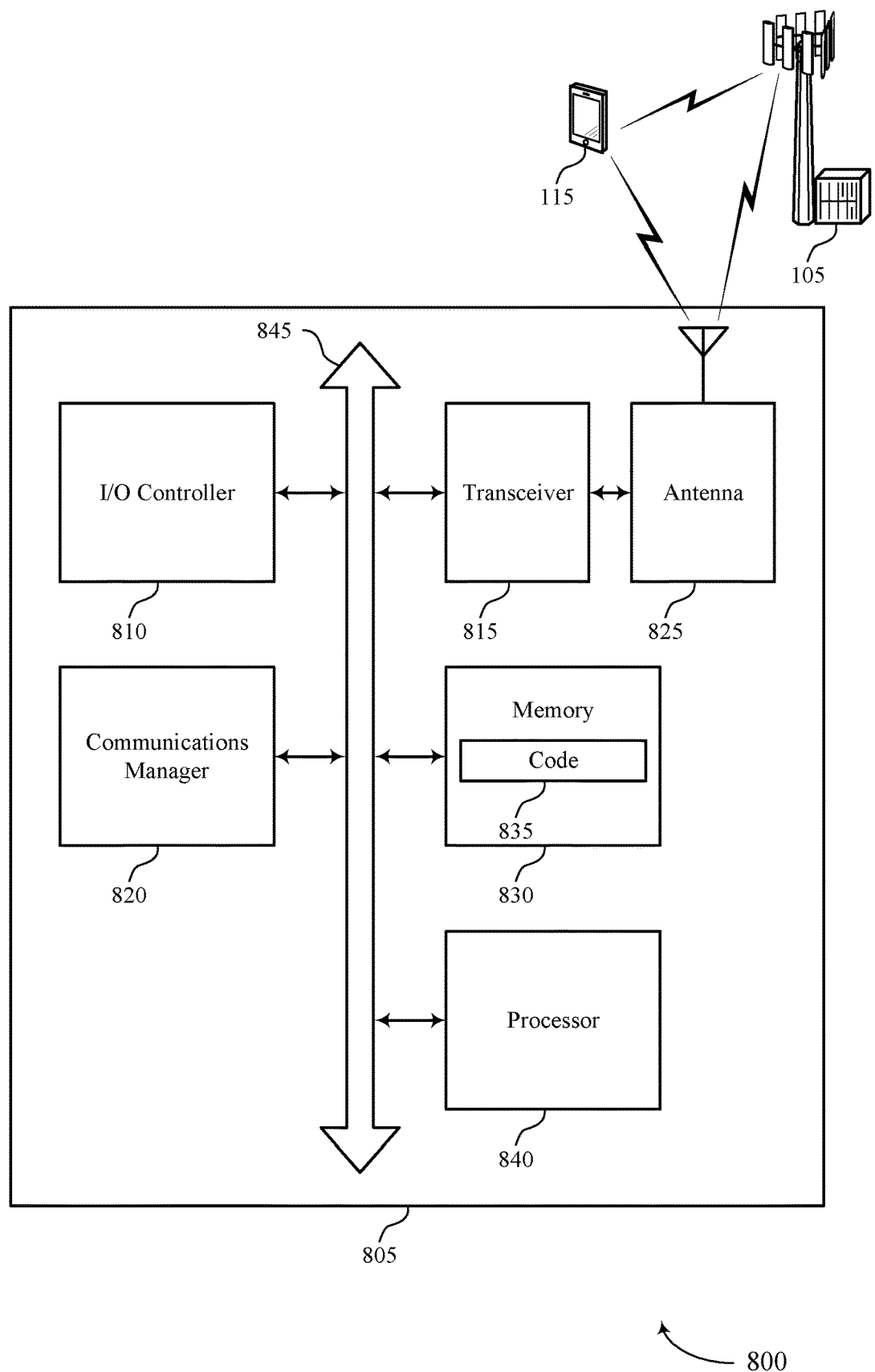
FIG. 8 shows a diagram of a system including a device that supports strategic channel sensing in accordance with aspects of the present disclosure.

FIG. 8 shows a diagram of a system 800 including a device 805 that supports strategic channel sensing in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting strategic channel sensing). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for performing, during at least a portion of a sensing window, a sensing process to identify a quantity of resources of a sidelink channel that are available for transmission by the UE during a selection window, the sensing window including a set of multiple contiguous time slots. The communications manager 820 may be configured as or otherwise support a means for terminating the sensing process before expiry of the sensing window based on the quantity of resources satisfying an early termination threshold. The communications manager 820 may be configured as or otherwise support a means for transmitting, during the selection window, a set of data over the sidelink channel using the quantity of resources.

By including or configuring the communications manager 820 in accordance with examples as described herein, the device 805 may support techniques for reduced processing and reduced power consumption.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of strategic channel sensing as described herein, or the processor 840 and the memory 830 may be otherwise configured to perform or support such operations.

Figure 9:
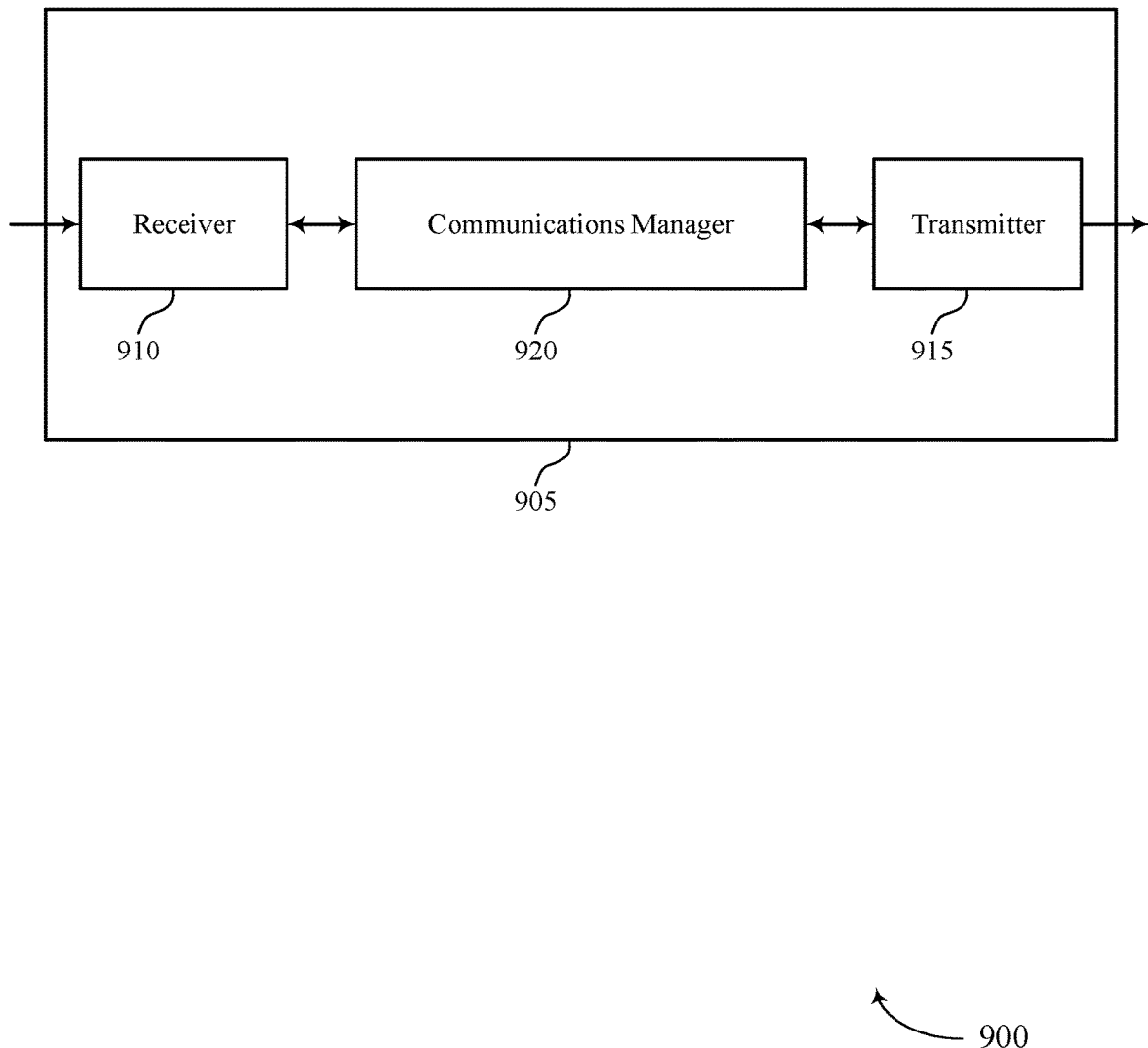
FIGS. 9 and 10 show block diagrams of devices that support strategic channel sensing in accordance with aspects of the present disclosure.

FIG. 9 shows a block diagram 900 of a device 905 that supports strategic channel sensing in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to strategic channel sensing). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to strategic channel sensing). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of strategic channel sensing as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a wireless device in accordance with examples as disclosed herein. For example, the communications manager 920 may be configured as or otherwise support a means for receiving operating information from a UE engaged in sidelink communications over a sidelink channel. The communications manager 920 may be configured as or otherwise support a means for transmitting, to the UE based on the operating information, a reliability factor associated with terminating a sensing process for the sidelink channel.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing and reduced power consumption.

Figure 10:
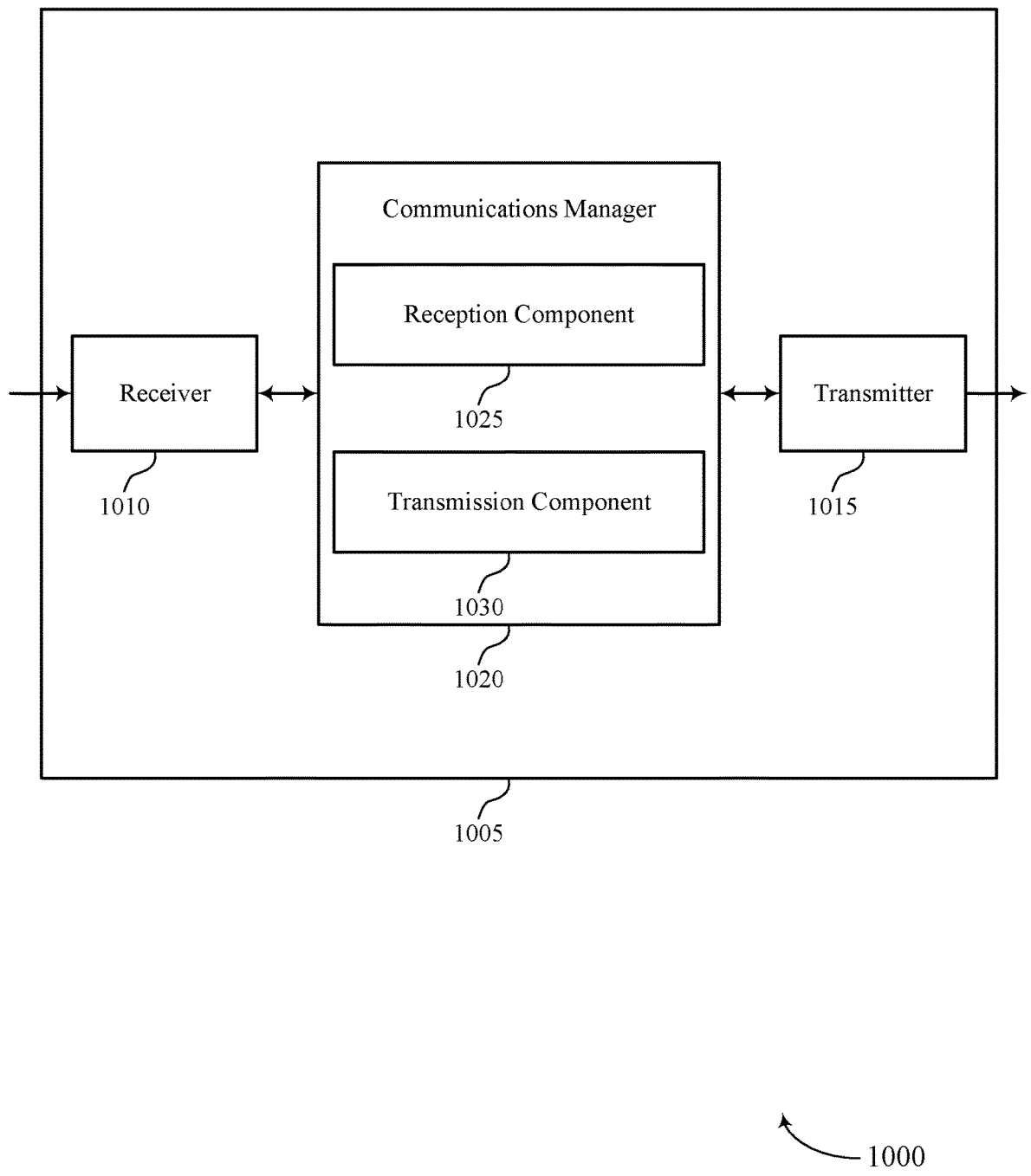

FIG. 10 shows a block diagram 1000 of a device 1005 that supports strategic channel sensing in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to strategic channel sensing). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to strategic channel sensing). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of strategic channel sensing as described herein. For example, the communications manager 1020 may include a reception component 1025 a transmission component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a wireless device in accordance with examples as disclosed herein. The reception component 1025 may be configured as or otherwise support a means for receiving operating information from a UE engaged in sidelink communications over a sidelink channel. The transmission component 1030 may be configured as or otherwise support a means for transmitting, to the UE based on the operating information, a reliability factor associated with terminating a sensing process for the sidelink channel.

Figure 11:
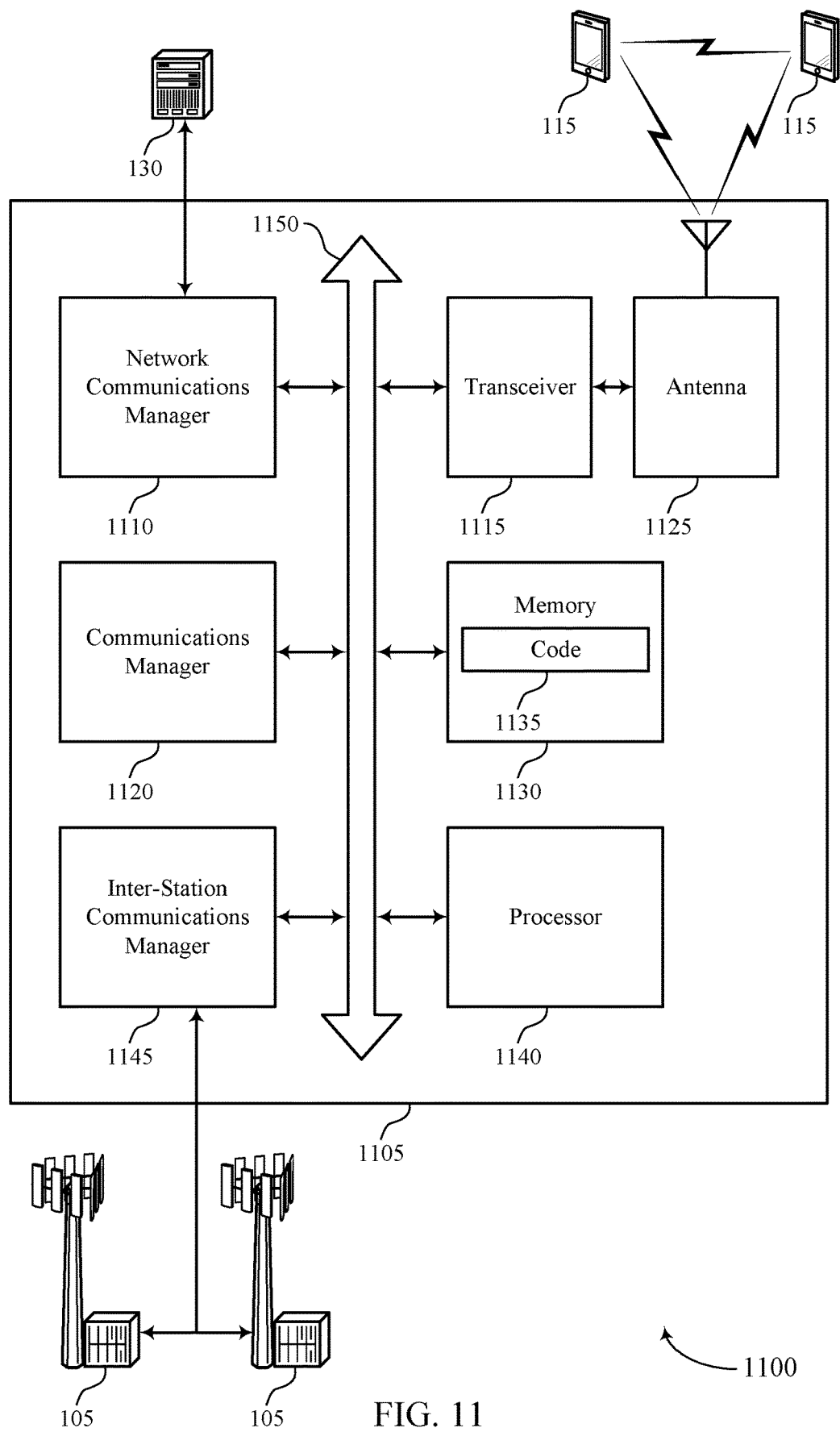
FIG. 11 shows a diagram of a system including a device that supports strategic channel sensing in accordance with aspects of the present disclosure.

FIG. 11 shows a diagram of a system 1100 including a device 1105 that supports strategic channel sensing in accordance with aspects of the present disclosure. The device 1105 may be an example of or include the components of a device 905, a device 1005, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 915, a transmitter 1015, a receiver 910, a receiver 1010, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting strategic channel sensing). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a wireless device in accordance with examples as disclosed herein. For example, the communications manager 1120 may be configured as or otherwise support a means for receiving operating information from a UE engaged in sidelink communications over a sidelink channel. The communications manager 1120 may be configured as or otherwise support a means for transmitting, to the UE based on the operating information, a reliability factor associated with terminating a sensing process for the sidelink channel.

By including or configuring the communications manager 1120 in accordance with examples as described herein, the device 1105 may support techniques for improved user experience related to reduced processing and reduced power consumption.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of strategic channel sensing as described herein, or the processor 1140 and the memory 1130 may be otherwise configured to perform or support such operations.

Figure 12:
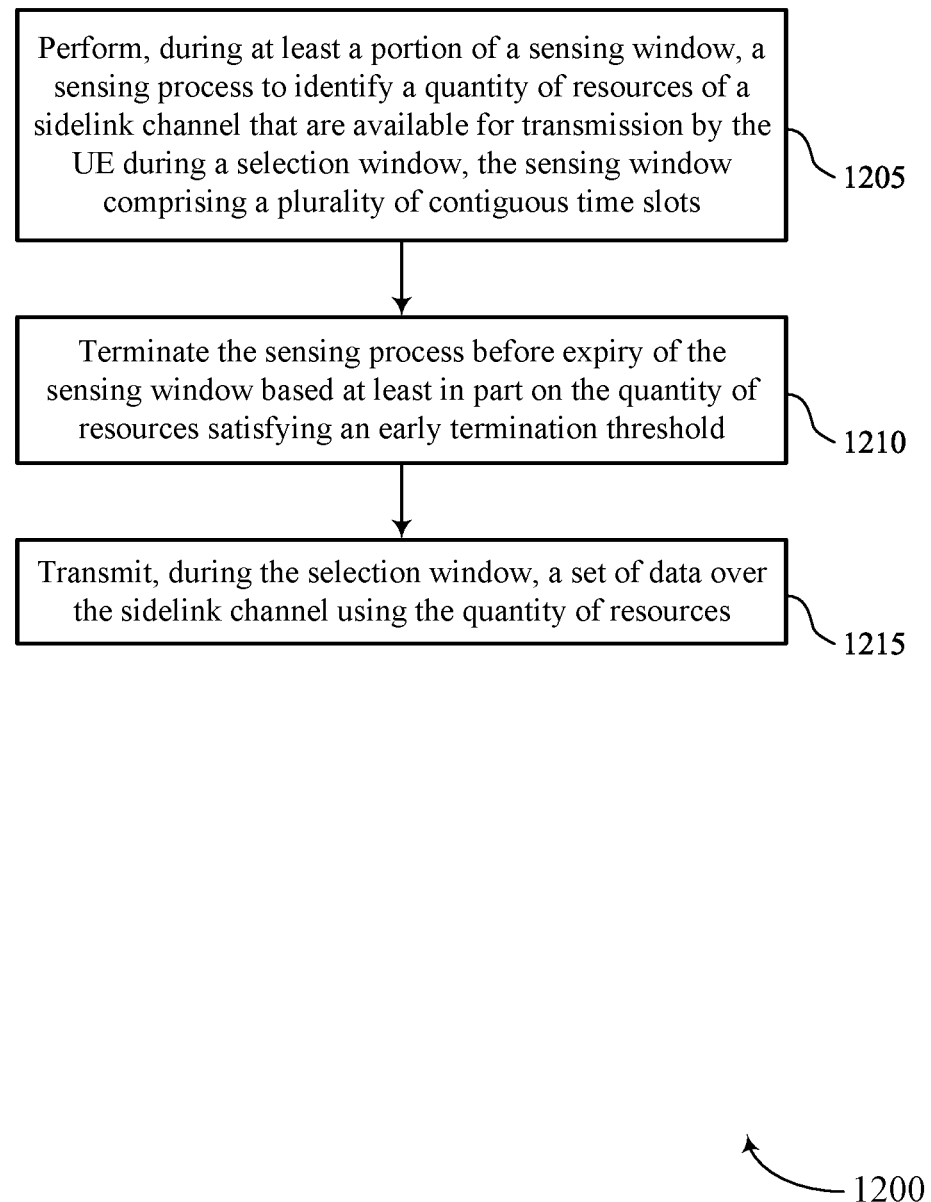
FIGS. 12 and 13 show flowcharts illustrating methods that support strategic channel sensing in accordance with aspects of the present disclosure.

FIG. 12 shows a flowchart illustrating a method 1200 that supports strategic channel sensing in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include performing, during at least a portion of a sensing window, a sensing process to identify a quantity of resources of a sidelink channel that are available for transmission by the UE during a selection window, the sensing window including a set of multiple contiguous time slots. The operations of 1205 may be performed in accordance with examples as disclosed herein. In some examples, aspects of the operations of 1205 may be performed by a sensing component 725 as described with reference to FIG. 7.

At 1210, the method may include terminating the sensing process before expiry of the sensing window based on the quantity of resources satisfying an early termination threshold. The operations of 1210 may be performed in accordance with examples as disclosed herein. In some examples, aspects of the operations of 1210 may be performed by a termination component 730 as described with reference to FIG. 7.

At 1215, the method may include transmitting, during the selection window, a set of data over the sidelink channel using the quantity of resources. The operations of 1215 may be performed in accordance with examples as disclosed herein. In some examples, aspects of the operations of 1215 may be performed by a transmission component 735 as described with reference to FIG. 7.

Figure 13:
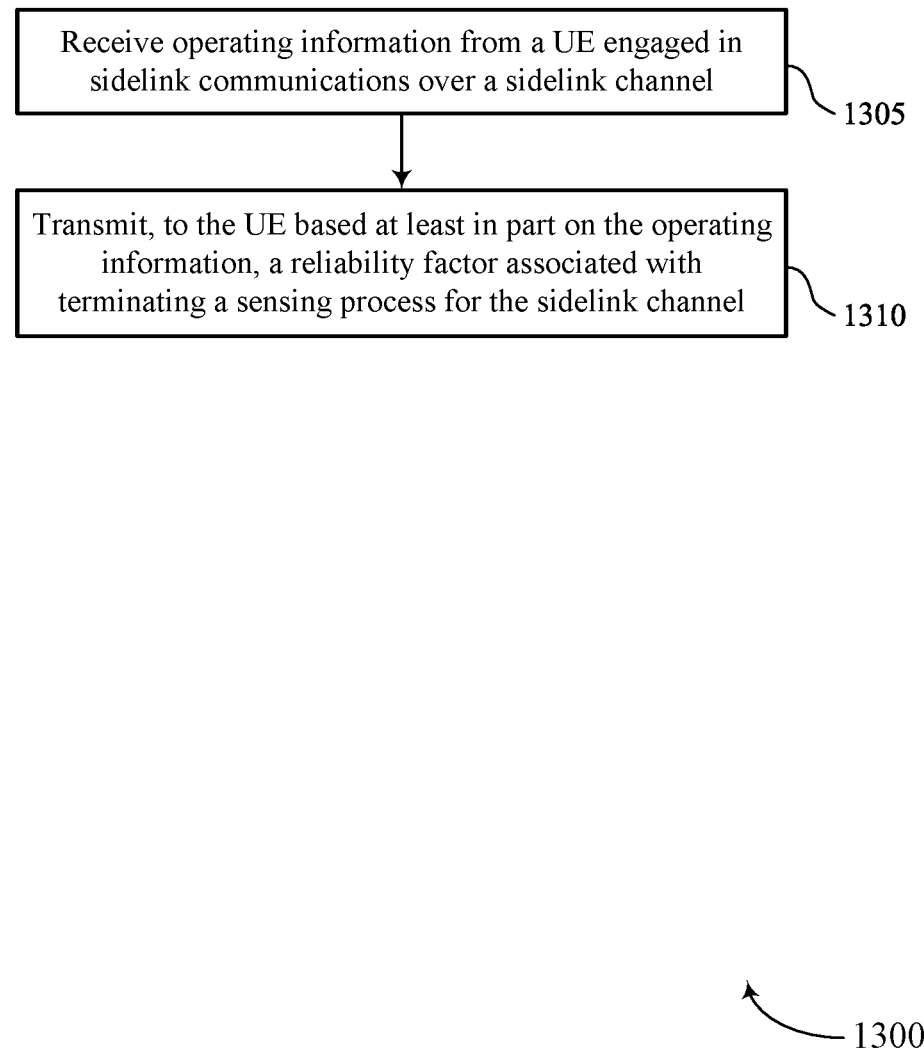

FIG. 13 shows a flowchart illustrating a method 1300 that supports strategic channel sensing in accordance with aspects of the present disclosure. The operations of the method 1300 may be implemented by a base station or its components as described herein. For example, the operations of the method 1300 may be performed by a base station 105 as described with reference to FIGS. 1 through 4 and 9 through 11. In some examples, a base station may execute a set of instructions to control the functional elements of the base station to perform the described functions. Additionally or alternatively, the base station may perform aspects of the described functions using special-purpose hardware.

At 1305, the method may include receiving operating information from a UE engaged in sidelink communications over a sidelink channel. The operations of 1305 may be performed in accordance with examples as disclosed herein. In some examples, aspects of the operations of 1305 may be performed by a reception component as described with reference to FIG. 10.

At 1310, the method may include transmitting, to the UE based on the operating information, a reliability factor associated with terminating a sensing process for the sidelink channel. The operations of 1310 may be performed in accordance with examples as disclosed herein. In some examples, aspects of the operations of 1310 may be performed by a transmission component as described with reference to FIG. 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: performing, during at least a portion of a sensing window, a sensing process to identify a quantity of resources of a sidelink channel that are available for transmission by the UE during a selection window, the sensing window comprising a plurality of contiguous time slots; terminating the sensing process before expiry of the sensing window based at least in part on the quantity of resources satisfying an early termination threshold; and transmitting, during the selection window, a set of data over the sidelink channel using the quantity of resources.

Aspect 2: The method of aspect 1, further comprising: receiving a reliability factor via radio resource control signaling or in a MAC-CE, wherein the early termination threshold is based at least in part on the reliability factor.

Aspect 3: The method of aspect 2, further comprising: transmitting operating information that comprises one or more of power information for the UE, priority information for the UE, a reliability target for the UE, or a recommended reliability factor, wherein the reliability factor is received based at least in part on transmitting the operating information.

Aspect 4: The method of any of aspects 1 through 3, further comprising: determining the early termination threshold based at least in part on a second quantity of resources for the set of data, the second quantity of resources associated with a transport block size for the set of data.

Aspect 5: The method of any of aspects 1 through 4, further comprising: determining the early termination threshold based at least in part on a product of a reliability factor and a second quantity of resources for the set of data.

Aspect 6: The method of aspect 5, further comprising: determining the reliability factor based at least in part on a quality-of-service associated with a transport block for the set of data.

Aspect 7: The method of any of aspects 5 through 6, further comprising: determining the reliability factor based at least in part on a priority level associated with the set of data.

Aspect 8: The method of any of aspects 1 through 7, further comprising: determining the early termination threshold based at least in part on a transport block size for the set of data and a modulation and coding scheme for the set of data.

Aspect 9: The method of any of aspects 1 through 8, further comprising: determining the early termination threshold based at least in part on a number of layers for the set of data.

Aspect 10: The method of aspect 9, further comprising: determining a target error rate for the set of data and channel state information for the sidelink channel, wherein the number of layers is based at least in part on target error rate and the channel state information.

Aspect 11: The method of any of aspects 1 through 10, wherein the sensing process comprises: determining a reference signal received power for resources associated with the sensing window, wherein the quantity of available resources is based at least in part on the reference signal received power.

Aspect 12: The method of any of aspects 1 through 11, further comprising: decoding sidelink control information associated with the sidelink channel, wherein the sensing process is performed on resources indicated by the sidelink control information.

Aspect 13: A method for wireless communication at a wireless device, comprising: receiving operating information from a UE engaged in sidelink communications over a sidelink channel; and transmitting, to the UE based at least in part on the operating information, a reliability factor associated with terminating a sensing process for the sidelink channel.

Aspect 14: The method of aspect 13, wherein the operating information comprises one or more of power information for the UE, priority information for the UE, a reliability target for the UE, or a recommended value for the reliability factor.

Aspect 15: The method of any of aspects 13 through 14, wherein the reliability factor is conveyed via radio resource control signaling or in a MAC-CE.

Aspect 16: The method of any of aspects 13 through 15, wherein the wireless device comprises a second UE or a base station.

Aspect 17: An apparatus for wireless communication at a UE, comprising a processor; memory coupled with the processor; and instructions stored in the memory and executable by the processor to cause the apparatus to perform a method of any of aspects 1 through 12.

Aspect 18: An apparatus for wireless communication at a UE, comprising at least one means for performing a method of any of aspects 1 through 12.

Aspect 19: A non-transitory computer-readable medium storing code for wireless communication at a UE, the code comprising instructions executable by a processor to perform a method of any of aspects 1 through 12.

Aspect 20: An apparatus for wireless communication at a wireless device, comprising a processor; memory coupled with the processor; and instructions stored in the memory and executable by the processor to cause the apparatus to perform a method of any of aspects 13 through 16.

Aspect 21: An apparatus for wireless communication at a wireless device, comprising at least one means for performing a method of any of aspects 13 through 16.

Aspect 22: A non-transitory computer-readable medium storing code for wireless communication at a wireless device, the code comprising instructions executable by a processor to perform a method of any of aspects 13 through 16.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. The various messages described herein may be conveyed via RRC signaling, in DCI, in MAC-CE, or in other suitable manners.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

performing, during at least a portion of a sensing window, a sensing process to identify a quantity of resources of a sidelink channel that are available for transmission by the UE during a selection window, the sensing window comprising a plurality of contiguous time slots;

terminating the sensing process partway through the sensing window based at least in part on the quantity of resources satisfying a threshold quantity of resources indicated by an early termination threshold, wherein the sensing window is determined before performing the sensing process, and wherein the early termination threshold is based at least in part on a second quantity of resources that is associated with a transport block size for a set of data scaled by a reliability factor; and transmitting, during the selection window, the set of data over the sidelink channel using the quantity of resources.

2. The method of claim 1, further comprising:

receiving a reliability factor via radio resource control signaling or in a medium access control (MAC) control element (MAC-CE), wherein the early termination threshold is based at least in part on the reliability factor.

3. The method of claim 2, further comprising:

transmitting operating information that comprises one or more of power information for the UE, priority information for the UE, a reliability target for the UE, or a recommended reliability factor, wherein the reliability factor is received based at least in part on transmitting the operating information.

4. The method of claim 1, further comprising:

determining the reliability factor based at least in part on a quality-of-service associated with a transport block for the set of data.

5. The method of claim 1, further comprising:

determining the reliability factor based at least in part on a priority level associated with the set of data.

6. The method of claim 1, further comprising:

determining the early termination threshold based at least in part on a modulation and coding scheme for the set of data.

7. The method of claim 1, further comprising:

determining the early termination threshold based at least in part on a number of layers for the set of data.

8. The method of claim 7, further comprising:

determining a target error rate for the set of data and channel state information for the sidelink channel, wherein the number of layers is based at least in part on target error rate and the channel state information.

9. The method of claim 1, wherein the sensing process comprises:

determining a reference signal received power for resources associated with the sensing window, wherein the quantity of resources is based at least in part on the reference signal received power.

10. The method of claim 1, further comprising:

decoding sidelink control information associated with the sidelink channel, wherein the sensing process is performed on resources indicated by the sidelink control information.

11. A method for wireless communication at a wireless device, comprising:

receiving operating information from a user equipment (UE) engaged in sidelink communications over a sidelink channel; and transmitting, to the UE, a reliability factor for the UE to use as a basis for an early termination threshold for terminating a sensing process for the sidelink channel, wherein the reliability factor is determined based at least in part on the operating information received from the UE, and wherein the early termination threshold is based at least in part on a quantity of resources that is associated with a transport block size for a set of data to be transmitted by the UE scaled by the reliability factor.

12. The method of claim 11, wherein the operating information comprises one or more of power information for the UE, priority information for the UE, a reliability target for the UE, or a recommended value for the reliability factor.

13. The method of claim 11, wherein the reliability factor is conveyed via radio resource control signaling or in a medium access control (MAC) control element (MAC-CE).

14. The method of claim 11, wherein the wireless device comprises a second UE or a network entity.

15. An apparatus for wireless communication at a user equipment (UE), comprising:
a processor;
memory coupled with the processor; and
instructions stored in the memory and executable by the processor to cause the apparatus to:
perform, during at least a portion of a sensing window, a sensing process to identify a quantity of resources of a sidelink channel that are available for transmission by the UE during a selection window, the sensing window comprising a plurality of contiguous time slots;
terminate the sensing process partway through the sensing window based at least in part on the quantity of resources satisfying a threshold quantity of resources indicated by an early termination threshold, wherein the sensing window is determined before performing the sensing process, and wherein the early termination threshold is based at least in part on a second quantity of resources that is associated with a transport block size for a set of data scaled by a reliability factor; and
transmit, during the selection window, the set of data over the sidelink channel using the quantity of resources.

16. The apparatus of claim 15, wherein the instructions are further executable by the processor to cause the apparatus to:
receive a reliability factor via radio resource control signaling or in a medium access control (MAC) control element (MAC-CE), wherein the early termination threshold is based at least in part on the reliability factor.

17. The apparatus of claim 16, wherein the instructions are further executable by the processor to cause the apparatus to:
transmit operating information that comprises one or more of power information for the UE, priority information for the UE, a reliability target for the UE, or a recommended reliability factor, wherein the reliability factor is received based at least in part on transmitting the operating information.

18. The apparatus of claim 15, wherein the instructions are further executable by the processor to cause the apparatus to:
determine the reliability factor based at least in part on a quality-of-service associated with a transport block for the set of data.

19. The apparatus of claim 15, wherein the instructions are further executable by the processor to cause the apparatus to:
determine the reliability factor based at least in part on a priority level associated with the set of data.

20. The apparatus of claim 15, wherein the instructions are further executable by the processor to cause the apparatus to:
determine the early termination threshold based at least in part on a modulation and coding scheme for the set of data.

21. The apparatus of claim 15, wherein the instructions are further executable by the processor to cause the apparatus to:
determine the early termination threshold based at least in part on a number of layers for the set of data.

22. The apparatus of claim 21, wherein the instructions are further executable by the processor to cause the apparatus to:
determine a target error rate for the set of data and channel state information for the sidelink channel, wherein the number of layers is based at least in part on target error rate and the channel state information.

23. The apparatus of claim 15, wherein the instructions are further executable by the processor to cause the apparatus to perform the sensing process by being executable by the processor to cause the apparatus to:
determine a reference signal received power for resources associated with the sensing window, wherein the quantity of resources is based at least in part on the reference signal received power.

24. The apparatus of claim 15, wherein the instructions are further executable by the processor to cause the apparatus to:
decode sidelink control information associated with the sidelink channel, wherein the sensing process is performed on resources indicated by the sidelink control information.

25. An apparatus for wireless communication at a wireless device, comprising:
a processor;
memory coupled with the processor; and
instructions stored in the memory and executable by the processor to cause the apparatus to:
receive operating information from a user equipment (UE) engaged in sidelink communications over a sidelink channel; and
transmit, to the UE, a reliability factor for the UE to use as a basis for an early termination threshold for terminating a sensing process for the sidelink channel, wherein the reliability factor is determined based at least in part on the operating information received from the UE, and wherein the early termination threshold is based at least in part on a quantity of resources that is associated with a transport block size for a set of data to be transmitted by the UE scaled by the reliability factor.

26. The apparatus of claim 25, wherein the operating information comprises one or more of power information for the UE, priority information for the UE, a reliability target for the UE, or a recommended value for the reliability factor.

* * * * *